(12) United States Patent
Sandhu

(10) Patent No.: US 8,278,653 B2
(45) Date of Patent: Oct. 2, 2012

(54) NANOPARTICLE POSITIONING TECHNIQUE

(75) Inventor: Gurtej Sandhu, Boise, ID (US)

(73) Assignee: Micron Technology, Inc., Boise, ID (US)

( * ) Notice: Subject to any disclaimer, the term of this patent is extended or adjusted under 35 U.S.C. 154(b) by 81 days.

(21) Appl. No.: 12/763,375

(22) Filed: Apr. 20, 2010

(65) Prior Publication Data

US 2010/0200836 A1 Aug. 12, 2010

Related U.S. Application Data

(63) Continuation of application No. 11/406,594, filed on Apr. 19, 2006, now Pat. No. 7,714,322.

(51) Int. Cl.
*H01L 51/00* (2006.01)

(52) U.S. Cl. .............. 257/40; 257/E51.04; 977/742; 977/762

(58) Field of Classification Search .......... 257/40, 257/E51.04; 977/742, 762
See application file for complete search history.

(56) References Cited

U.S. PATENT DOCUMENTS

| | | | |
|---|---|---|---|
| 6,146,227 A * | 11/2000 | Mancevski | 445/24 |
| 6,831,017 B1 * | 12/2004 | Li et al. | 438/694 |
| 7,214,553 B2 * | 5/2007 | Legagneux et al. | 438/20 |
| 7,226,663 B2 | 6/2007 | Jiao et al. | |
| 7,682,591 B2 * | 3/2010 | Black et al. | 423/447.3 |
| 7,714,322 B2 * | 5/2010 | Sandhu | 257/40 |

OTHER PUBLICATIONS

H.C. Choi et al., Efficient Formation of Iron Nanoparticle Catalysts on Silicon Oxide by Hdroxylamine for Carbon Nanotube Synthesis and Electronics, 3 Nano Letters 157-161 (2003).

T. Rueckes et al., Carbon Nanotube-Based nanvolatile Random Access Memory for Molecular Computing, 289 Science 94-97 (2000).

* cited by examiner

*Primary Examiner* — Randy Boyer
(74) *Attorney, Agent, or Firm* — Fletcher Yoder

(57) ABSTRACT

Embodiments of the present invention are generally directed to a method for disposing nanoparticles on a substrate. In one embodiment, a substrate having a plurality of recesses is provided. In this embodiment, a plurality of nanoparticles is also provided. The nanoparticles include a catalyst material coupled to one or more ligands, and these nanoparticles are disposed within respective recesses of the substrate. In some embodiments, the substrate is processed to form nanostructures, such as nanotubes or nanowires, within the recesses. Devices and systems having such nanostructures are also disclosed.

11 Claims, 4 Drawing Sheets

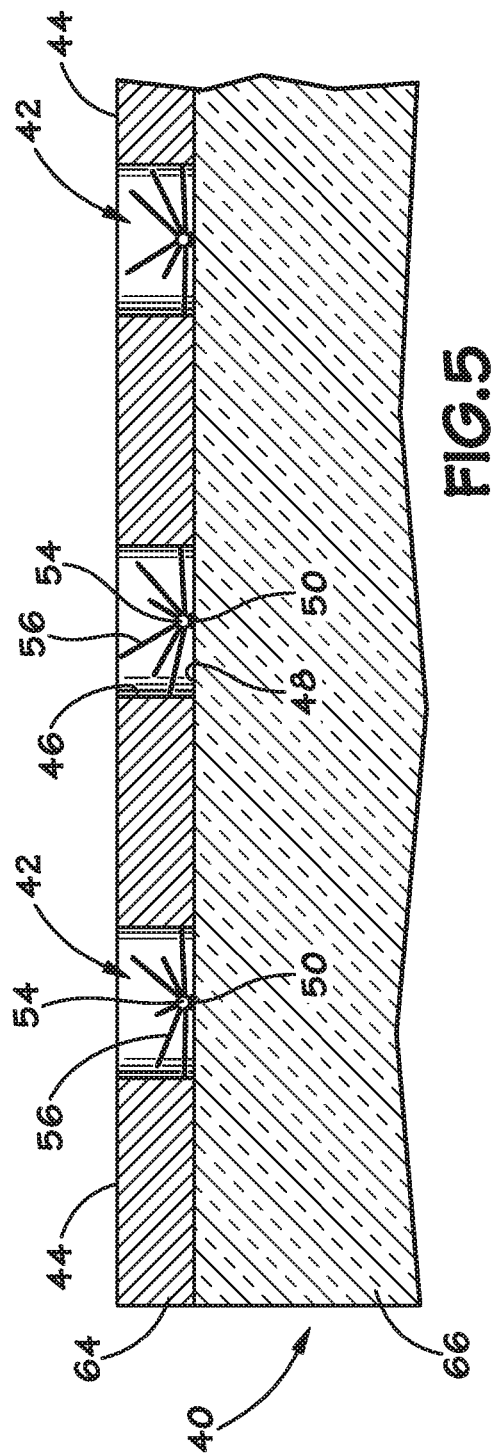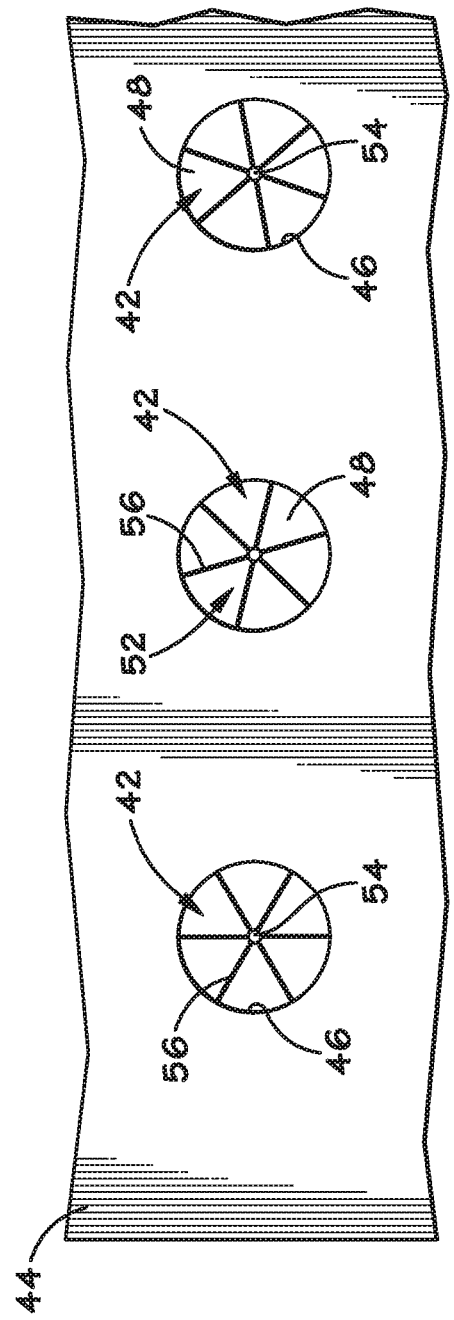

NANOPARTICLE POSITIONING TECHNIQUE

CROSS-REFERENCE TO RELATED APPLICATIONS

This application is a continuation of and claims priority to U.S. patent application Ser. No. 11/406,594, filed on Apr. 19, 2006.

BACKGROUND OF THE INVENTION

1. Field of the Invention

The present invention relates generally to electronic devices, such as memory devices. More particularly, the present invention relates to efficient and accurate formation and spacing of nanotubes on a substrate of an electronic device.

2. Description of the Related Art

This section is intended to introduce the reader to various aspects of art that may be related to various aspects of the present invention, which are described and/or claimed below. This discussion is believed to be helpful in providing the reader with background information to facilitate a better understanding of the various aspects of the present invention. Accordingly, it should be understood that these statements are to be read in this light, and not as admissions of prior art.

Microprocessor-controlled circuits are used in a wide variety of applications. Such applications include personal computers, control systems, telephone networks, and a host of other consumer products. A personal computer or control system includes various components, such as microprocessors, that handle different functions for the system. By combining these components, various consumer products and systems may be designed to meet specific needs. Microprocessors are essentially generic devices that perform specific functions under the control of software programs. These software programs are generally stored in one or more memory devices that are coupled to the microprocessor or other peripherals.

Electronic components such as microprocessors and memory devices often include numerous integrated circuits manufactured on a semiconductor substrate. The various structures or features of these integrated circuits may be fabricated on a substrate through a variety of manufacturing processes known in the art, including layering, doping, and patterning. Obviously, the size of each feature directly impacts the number of features that may be formed on a substrate of a given size. Accordingly, it is generally desirable to reduce the size of such features in order to increase the number of elements that may be formed in a given area of the substrate.

Recently, it has been found that various nanostructures, such as nanotubes or nanowires, may be grown on a substrate by providing, and then processing, a catalyst material positioned on the substrate. Such nanostructures are quite versatile and, depending on the catalyst material and processing technique used, may be electrically conducting, insulating, or semiconducting. These structures are also quite small; certain single-walled nanotubes are known to be as small as one nanometer in diameter, while multi-walled nanotubes may be tens of nanometers in diameter. Based on their versatility and small size, these nanostructures are believed to be relevant to satisfying the general desire to provide ever decreasing dimension sizes of integrated circuits. The small sizes of these nanostructures, however, present certain difficulties with respect to efficiently forming and positioning these nanostructures. Particularly, due to the size of the features and the need to align multiple features with one another to produce an operable device, these nanostructures should be precisely placed to ensure alignment of the various structures. One known method for positioning nanostructures such as nanotubes is to grow the structures and then individually position them at a desired location on a substrate. As will be appreciated, this technique is time-consuming, costly, and inefficient.

There is a need, therefore, for a technique for efficiently and precisely positioning nanostructures, such as nanotubes and nanowires, on a substrate. There is a further need for devices and systems that incorporate nanostructures that are accurately disposed in desired locations on a substrate.

SUMMARY OF THE INVENTION

Certain aspects commensurate in scope with the originally claimed invention are set forth below. It should be understood that these aspects are presented merely to provide the reader with a brief summary of certain forms the invention might take and that these aspects are not intended to limit the scope of the invention. Indeed, the invention may encompass a variety of aspects that may not be set forth below.

Embodiments of the present invention are generally related to a technique for the efficient formation of nanostructures on desired locations of a substrate, and devices and systems containing such a substrate. In some embodiments, a substrate having multiple cylindrical recesses formed in an upper surface of the substrate is provided. In these embodiments, a solution containing catalytic nanoparticles may be applied to the substrate. The catalytic nanoparticles include one or more catalysts for producing nanostructures, as well as ligands attached to the catalysts.

In certain embodiments, the ligands are selected to attach to the catalyst material to produce a catalytic nanoparticle of a predetermined size with respect to the size of the recesses of the substrate. In one embodiment, the ligands are selected to result in a nanoparticle that is commensurate in size with the size of a recess in the substrate such that only one nanoparticle may be disposed within the recess. Additionally, in a further embodiment, the catalyst material is generally centered within the nanoparticle with the ligands attached about the catalyst material, wherein the ligands cooperate with a recess of the substrate such that the nanoparticle is self-aligning, i.e., the catalyst material is positioned proximate the center of the recess.

In some embodiments, the ligands may be removed once the nanoparticles are positioned within the recesses. In additional embodiments, the substrate having the catalyst material is processed to form nanostructures on the surface of the substrate. These nanostructures may be formed through laser ablation, arc-discharge, chemical vapor deposition, or other techniques, and may include carbon nanotubes or nanowires, as well as other, non-carbon nanotubes or nanowires.

BRIEF DESCRIPTION OF THE DRAWINGS

Advantages of the invention may become apparent upon reading the following detailed description and upon reference to the drawings in which:

FIG. 5 is a cross-sectional view of the substrate of FIG. 3, taken along the line 5-5, illustrating nanoparticle seeds disposed within the recesses in accordance with one embodiment of the present invention;

FIG. 6 is a top plan view of the substrate and nanoparticle seed material provided in FIG. 5 and illustrates the position of the catalytic nanoparticles with respect to the recesses of the substrate in accordance with one embodiment of the present invention;

DETAILED DESCRIPTION OF SPECIFIC EMBODIMENTS

One or more specific embodiments of the present invention will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Figure 1:
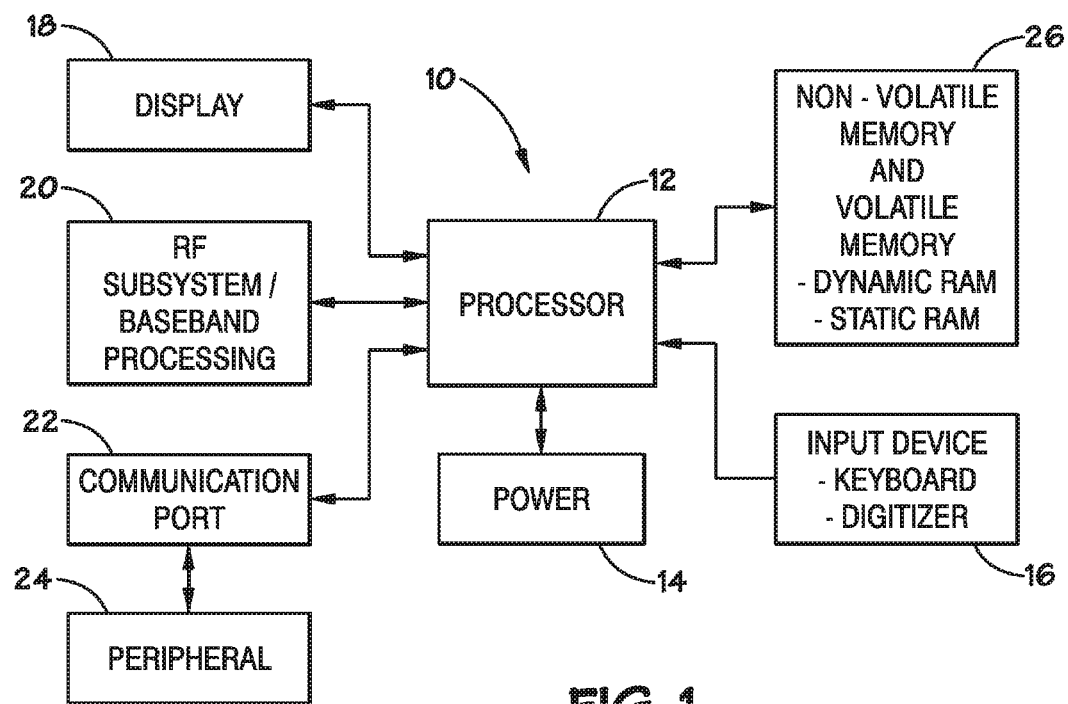
FIG. 1 illustrates a block diagram of an exemplary processor-based device in accordance with one embodiment of the present invention.

Turning now to the drawings, FIG. 1 is a block diagram of an electronic system containing integrated circuit devices that may employ embodiments of the present invention. The electronic device or system, which is generally referred to by the reference numeral 10, may be any of a variety of types such as a computer, pager, cellular phone, personal organizer, or the like. In a typical processor-based device, a processor 12, such as a microprocessor, controls the operation of system functions and requests.

The system 10 may include a power supply 14, which may comprise a battery or batteries, an AC power adapter, or a DC power adapter, for instance. Various other devices may be coupled to the processor 12 depending on the functions that the system 10 performs. For example, an input device 16 may be coupled to the processor 12 to receive input from a user. The input device 16 may comprise a user interface and may include buttons, switches, a keyboard, a light pen, a mouse, a digitizer, a voice recognition system, or any of a number of other input devices. An audio or video display 18 may also be coupled to the processor 12 to provide information to the user. The display 18 may include an LCD display, a CRT, LEDs, or an audio display, for example.

An RF sub-system/baseband processor 20 may be coupled to the processor 12 to provide wireless communication capability. The RF subsystem/baseband processor 20 may include an antenna that is coupled to an RF receiver and to an RF transmitter (not shown). Furthermore, a communications port 22 may be adapted to provide a communication interface between the electronic system 10 and a peripheral device 24. The peripheral device 24 may include a docking station, expansion bay, or other external component.

The processor 12 may be coupled to various types of memory devices to facilitate its operation. For example, the processor 12 may be connected to memory 26, which may include volatile memory, non-volatile memory, or both. The volatile memory of memory 26 may comprise a variety of memory types, such as static random access memory ("SRAM"), dynamic random access memory ("DRAM"), first, second, or third generation Double Data Rate memory ("DDR1", "DDR2", or "DDR3", respectively), or the like. The non-volatile memory may comprise various types of memory such as electrically programmable read only memory ("EPROM") or flash memory, for example. Additionally, the non-volatile memory may include a high-capacity memory such as a tape or disk drive memory.

The processor 12 and the memory 26 may employ one or more integrated circuit components. Also, the processor 12 and the memory 26 are examples of integrated circuit components that may include sense amplifier circuits constructed in accordance with embodiments of the present invention. One or more components of system 10 may include nano structures, such as nanotubes or nanowires, grown from a catalytic nanoparticle or seed as discussed in greater detail below.

Figure 2:
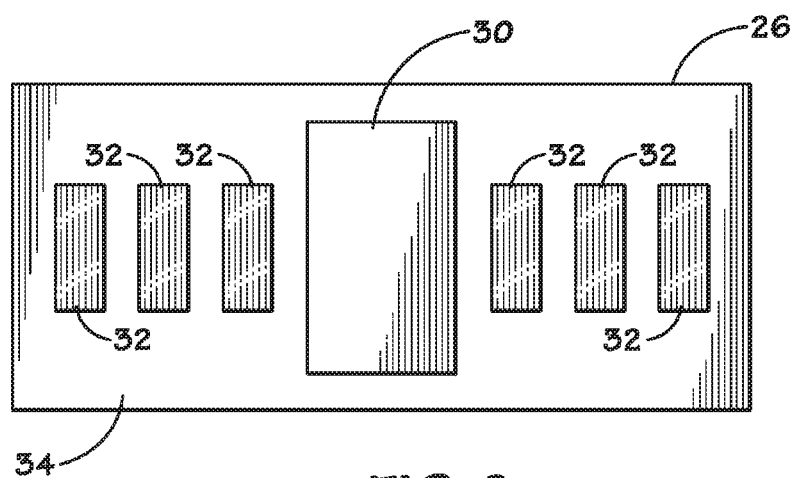
FIG. 2 illustrates an exemplary memory array in accordance with one embodiment of the present invention.

In some embodiments, memory 26 may include a multichip memory array, as illustrated in FIG. 2. In this arrangement, a memory controller 30 is coupled to a plurality of memory devices 32. The memory controller 30 and the memory devices 32 are surface mounted in a planar fashion on the same substrate 34, such as a printed circuit board. Components of the memory 26 may include nanostructures, including nanotubes or nanowires, formed in accordance with the present techniques.

An exemplary process for positioning and forming nanostructures on a substrate may be better understood with reference to FIGS. 3-8. Particularly, a substrate 40 illustrated in FIG. 3 may be provided in accordance with one embodiment of the present technique. The substrate 40 includes a plurality of recesses 42 formed in an upper surface 44 of the substrate 40. In the presently illustrated embodiment, the recesses 42 are cylindrical holes, each defined by a sidewall 46 and a bottom surface 48. It should be understood, however, that other embodiments may employ recesses having geometric shapes and dimensions different than that illustrated in FIG. 3. Indeed, other embodiments may employ a substrate having irregularly shaped holes in accordance with the present techniques. Additionally, in some embodiments, the bottom surface 48 of one or more recesses 42 includes an electrical contact 50 that may facilitate electrical communication with nanostructures formed within the recesses 42, as discussed in greater detail below. As will be appreciated, the electrical contacts 50 may be coupled to other circuitry through interconnections and vias, which are not presently shown for the sake of clarity, within the substrate 40.

As noted above, it is known that nanostructures, such as nanotubes and nanowires, may be grown from catalytic nanoparticles or "seeds." As will also be appreciated, the location of the resulting nanostructures depends upon the initial placement of the seed material used to grow the structures. Consequently, the present technique is directed, in part, to the formation and positioning of such catalytic nanoparticles within the recesses 42 of the substrate 40. More specifically, the present technique includes the formation of catalytic nanoparticles of a predetermined size that is selected based on the amount of catalytic material desired for the nanostructure formation process within the recesses 42 of the substrate 40, as well as based on the size of each recess 42.

Figure 4:
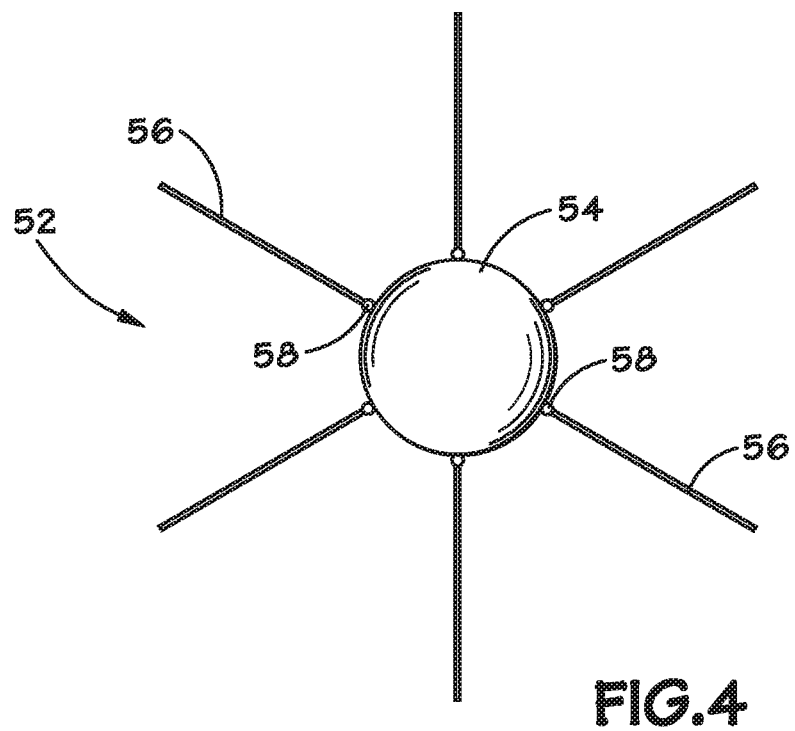
FIG. 4 is a representation of the general structure of a single catalytic nanoparticle or seed, including a catalyst material and at least one attached ligand, that may be deposited within a recess of the substrate illustrated in FIG. 3 in accordance with one embodiment of the present invention.

In accordance with this technique, an exemplary catalytic nanoparticle 52 is illustrated in FIG. 4. The nanoparticle 52 includes a catalyst material 54, such as iron or nickel. As will be appreciated, the catalyst material 54 may be processed to form nanotubes or nanowires. Known processing techniques for the formation of such nanostructures include laser ablation, arc-discharge, or a chemical vapor deposition process. The nanoparticle 52 also includes one or more ligands 56 coupled to the catalyst material 54 via chemical bonds 58. As will be appreciated, the ligands 56 may be attached to the catalyst material 54 through a microemulsion templated synthesis process that results in the formation of catalytic nanoparticles 52.

Notably, the ligands 56 may be selected from a variety of ligands known in the art based on the desired dimensions of the nanoparticle 52. As will be appreciated, the recesses 42 define a finite volume in which one or more nanoparticles 52 may be disposed. In some embodiments, the ligands 56 to be joined to catalyst material 54 are selected and configured to control the number and positioning of nanoparticles 52 that may be disposed within the recesses 42. For instance, in one embodiment, the recesses 42 are 2-10 nanometers in diameter and the ligands 56 are molecules coupled to a catalyst material 54 to form a catalytic nanoparticle 52 that is 1-5 nanometers in size. For example, in one embodiment, the ligands 56 are a thiol compound, such as dodecanethiol ($CH_3(CH_2)_{10}CH_2SH$), in which the alkyl length can be adjusted to match the size of the recesses 42. However, other compounds may be used as the ligands 56 in accordance with the present techniques. Furthermore, exemplary catalysts may include, but are not limited to, iron, nickel, gold, platinum, palladium, cobalt, titanium, tantalum, or the like.

The catalytic nanoparticles 52 may be disposed within recesses 42 in a variety of manners. In one embodiment, a solution containing the nanoparticles 52 is applied to the recesses 42 of the substrate 40 by immersing the substrate 40 within a bath containing the solution. It will be appreciated, however, that other techniques may also be employed to apply the solution to the substrate 40, including pouring, spraying, or vapor depositing the solution onto the substrate 40. After the solution is applied to the substrate 40, any excess solution may be removed from the upper surface 44 of the substrate 40. The removal of excess solution may be effected through any of a number of known techniques, such as by spinning or rinsing the excess solution off of the substrate 40.

Figure 3:
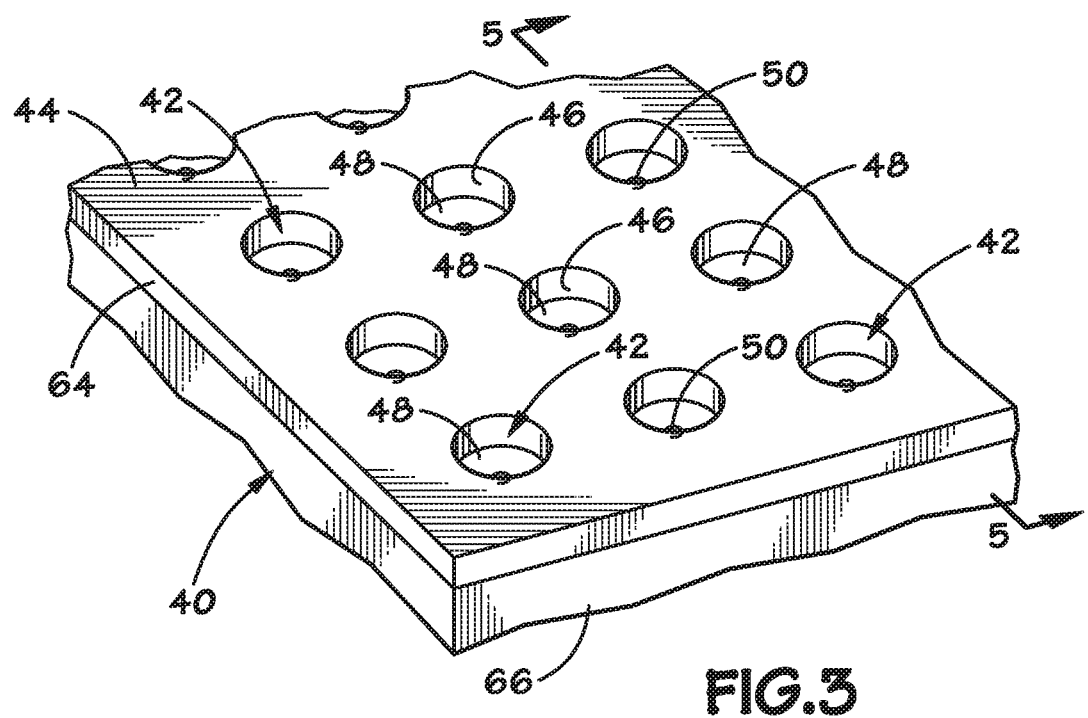
FIG. 3 is a partial perspective view of an exemplary substrate having multiple recesses formed in its upper surface for receiving catalytic nanoparticles, or seed material, for the formation of nanostructures in accordance with one embodiment of the present invention.

FIG. 5 illustrates a cross-section of the substrate 40 of FIG. 3 following the placement of nanoparticles 52 within the recesses 42, as discussed above. As also noted above, the number of nanoparticles that may be received within the recesses 42 is dictated by the relative size of the nanoparticles with respect to the size of the recesses. In the present embodiment, the size of each nanoparticle 52 is generally commensurate in size with that of each recess 42. Consequently, in this case, only a single nanoparticle 52 is disposed within each recess 42.

It should be noted that substrate 40 may be constructed of a homogenous material in certain embodiments. However, in the presently illustrated embodiment, substrate 40 includes multiple layers, such as an upper layer 64 and a lower layer 66. In certain embodiments, upper layer 64 may be an oxide layer disposed on a lower layer 66 of silicon. Of course, other embodiments may have layers formed of different materials in full accordance with the present techniques. The recesses 42 may be formed in the substrate 40 in a variety of manners, such as through etching of the oxide layer 64. It will be appreciated that a multi-layer substrate, such as that presently illustrated, facilitates control of such etching.

As shown in the presently illustrated embodiment, the structure of a nanoparticle 52, with the catalyst material 54 centered within the nanoparticle 52 and surrounded by ligands 56, cooperates with the recess 42 such that the catalyst material 54 is centered within each recess 42. This centering is further depicted in FIG. 6, which is a top plan view of the substrate and nanoparticles illustrated in FIG. 5. Particularly, the ligands 56 cooperate with the sidewalls 46 of the recesses 42, resulting in nanoparticles that are self-aligning within the recesses 42. In other words, as shown in FIG. 6, the structure of the nanoparticles 52 causes the catalyst material 54 to be positioned at or near the center of each recess 42, while the ligands 56 extend from material 54 to a respective sidewall 46. While the embodiment of FIG. 5 includes catalytic nanoparticles 52 having ligands 56 generally extending within a semi-spherical volume about the upper portion of catalyst material 54, it will be appreciated that the ligands could extend in some other fashion, such as within a spherical volume about the catalyst material. Other shapes of the recesses 42 and arrangement of the ligands 56 are also envisaged, such as a generally square or rectangular shape, some other regular or irregular polygonal shape, or an irregular shape.

Figure 7:
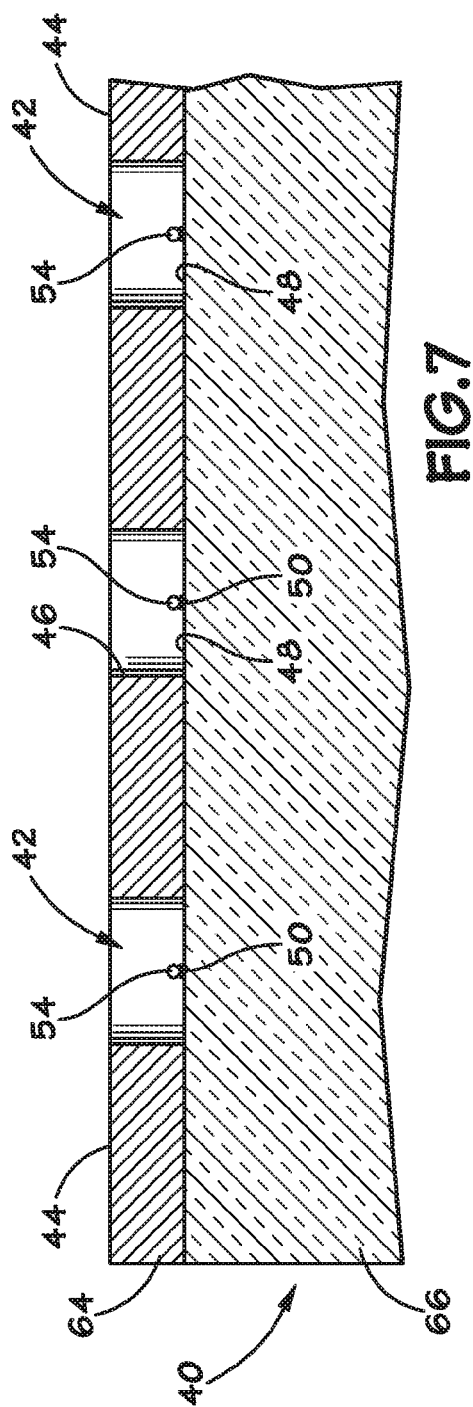
FIG. 7 is a cross-sectional view of the substrate and nanoparticles provided in FIG. 5 in which the ligands of the catalytic nanoparticles have been removed in accordance with one embodiment of the present invention.

Once the nanoparticles are disposed within the recesses 42, the ligands 56 may be removed from the catalyst material 54, as illustrated in FIG. 7. In some embodiments, the ligands 56 are burned off through exposure to oxygen or an oxygen plasma at high temperature. In other embodiments, however, it may be desirable to remove the ligands in some other fashion, or to leave the ligands 56 coupled to the catalyst material 54. In the case of catalytic nanoparticles 52 having ligands 56 extending in a spherical volume about the catalyst material 54, it will be appreciated that the ligands could still cooperate with the recess to axially align the catalyst material 54 within the recess. The ligands may then be removed, as discussed immediately above, thereby depositing the catalyst material 54 on the surface 48 (or contact 50) in the center of the recess 42.

Figure 8:
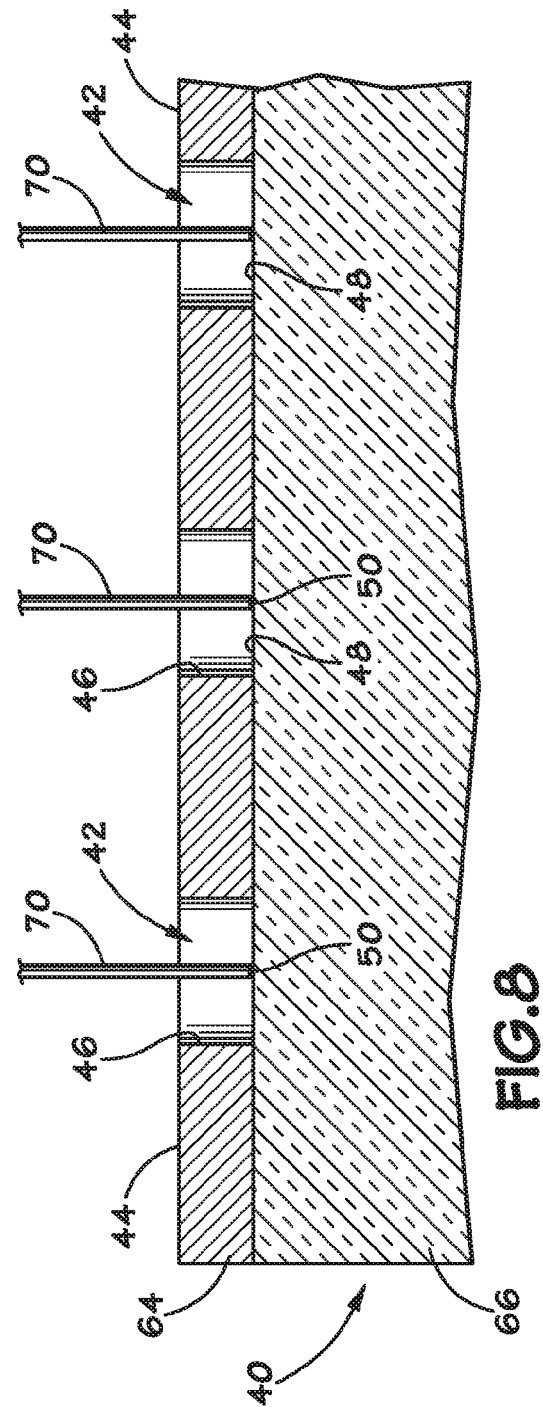
FIG. 8 is a cross-sectional view of the substrate of FIG. 5 illustrating the position of nanostructures grown from the seed material in accordance with one embodiment of the present invention.

Following the disposal of the catalyst material 54 within the recesses 42, various nanostructures 70 may be formed, as illustrated in FIG. 8. The nanostructures 70 may be grown from the catalyst material 54 through a number of techniques, including, but not limited to, chemical vapor deposition, including plasma or thermal chemical vapor deposition, physical vapor deposition, spin-on coating, molecular beam epitaxy, atomic layer deposition, or laser ablation. As will be appreciated, the characteristics of the resulting nanostructure 70 will largely depend on the catalyst material 54 and the processing technique used. In one embodiment, a chemical vapor deposition process is used to form nanostructures 70 that are carbon nanotubes. In other embodiments, different catalysts and/or processing techniques may be utilized in order to instead produce nanostructures 70 that are nanowires or non-carbon nanotubes. As will be appreciated, these nanostructures may be used as various elements of an integrated circuit. For example, in one embodiment, a semiconducting nanotube may be coupled between two electrical contacts, such as contact 50 discussed above, to operate as a transistor.

While the invention may be susceptible to various modifications and alternative forms, specific embodiments have been shown by way of example in the drawings and have been described in detail herein. However, it should be understood that the invention is not intended to be limited to the particular forms disclosed. Rather, the invention is to cover all modifications, equivalents, and alternatives falling within the spirit and scope of the invention as defined by the following appended claims.

What is claimed is:

1. A device comprising:
   a substrate having a plurality of recesses formed in a surface of the substrate, each recess of the plurality of recesses configured to receive at least one nanoparticle; and
   a plurality of catalytic nanoparticles for nanostructure growth disposed within the plurality of recesses, each of the plurality of catalytic nanoparticles comprising:
   a catalyst material; and
   at least one thiol compound coupled to the catalyst material, wherein the at least one thiol compound increases the size of the catalytic nanoparticle with respect to the recess such that no more than a predetermined number of catalytic nanoparticles can be positioned within the recess, and wherein the at least one thiol compound surrounds the catalyst material such that the catalytic nanoparticle is self-aligning with respect to the recess.

2. The device of claim 1, wherein the predetermined number of catalytic nanoparticles is equal to one catalytic nanoparticle.

3. The device of claim 2, wherein the one catalytic nanoparticle within the recess is substantially centered within the recess.

4. The device of claim 1, wherein the plurality of recesses comprises an electrical contact.

5. The device of claim 4, wherein the at least one thiol compound comprises a plurality of thiol compounds coupled to the catalyst material such that each of the plurality of catalytic nanoparticles is self-aligning with respect to both the recess as well as with the electrical contact within the recess.

6. A device comprising:
   a substrate having a recess formed in a surface of the substrate, the recess configured to receive only a single catalytic nanoparticle configured to be self-aligning with respect to the recess;
   a single nanostructure grown from the single catalytic nanoparticle disposed within the recess, wherein the single nanostructure is substantially centered within the recess, and the nanostructure comprises a thiol compound that was coupled to a catalyst material of the catalytic nanoparticle prior to growth of the nanostructure; and
   an electrical contact disposed within the recess to facilitate electrical communication with the single nanostructure.

7. The device of claim 6, wherein the nanostructure comprises a nanotube.

8. A product produced by a method of manufacture comprising:
   providing a substrate, the substrate including a plurality of recesses formed in a surface of the substrate;
   providing a solution containing a plurality of nanoparticles, each of the nanoparticles including a catalyst material for nanostructure growth and at least one thiol compound coupled to the catalyst material, wherein the at least one thiol compound surrounds the catalyst material such that the nanoparticle is self-aligning with respect to the recess; and
   disposing at least one nanoparticle of the plurality of nanoparticles in each of the plurality of recesses by applying the solution containing the plurality of nanoparticles to the surface of the substrate and removing a portion of the solution from the surface.

9. A device comprising:
   a substrate having a recess formed in a surface of the substrate, the recess configured to receive a nanoparticle;
   a nanostructure grown from a catalytic nanoparticle disposed within the recess, the catalytic nanoparticle including a catalyst material and a plurality of thiol compounds coupled to the catalyst material, wherein the plurality of thiol compounds increases the size of the catalytic nanoparticle with respect to the recess such that no other catalytic nanoparticles can be positioned within the recess and the plurality of thiol compounds surrounds the catalyst material such that the catalytic nanoparticle is substantially centered within the recess and self-aligning with respect to the recess, and wherein the nanostructure is substantially centered within the recess; and
   an electrical contact disposed within the recess to facilitate electrical communication with the nanostructure.

10. The device of claim 1, wherein the at least one thiol compound comprises dodecanethiol.

11. The device of claim 1, wherein the at least one thiol compound is coupled to the catalyst material via a microemulsion templated synthesis process.

* * * * *